Aug. 14, 1934.  A. V. COURTRIGHT  1,970,360
ELECTRIC FOOD HEATING APPARATUS
Filed Oct. 20, 1931

Inventor
A. V. Courtright
By W. S. McDowell
Attorney

Patented Aug. 14, 1934

1,970,360

UNITED STATES PATENT OFFICE 1,970,360

ELECTRIC FOOD HEATING APPARATUS

Alva V. Courtright, Circleville, Ohio

Application October 20, 1931, Serial No. 569,973

11 Claims. (Cl. 219—19)

This invention relates to an apparatus for cooking or heating food products such as sausages, frankfurters and the like and is directed more particularly to an apparatus of this character which may be used for cooking, heating or warming such articles and dispensing the same in public places.

The principal objects of the invention are to provide an electrical heating apparatus for this purpose which is of extremely simple construction, economical and easy to operate.

A further object is to provide an apparatus or device wherein the ordinary glowing heating element is eliminated and to utilize the food article itself as a resistance to the flow of electrical current and thereby produce the desired heat of said article.

A still further object of the invention is to provide an improved cooking or heating apparatus for the preparation of edibles for vending purposes in a sanitary manner whereby the heating of such edibles is within the ready control of the operator or dispensor.

Figure 1:
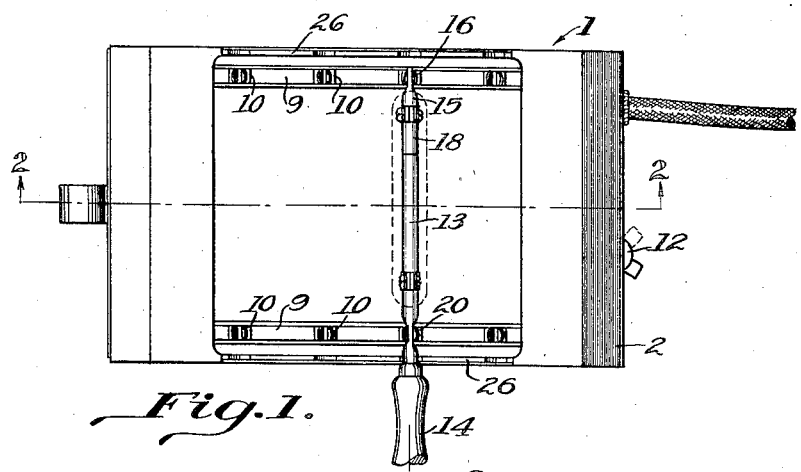
Figure 2:
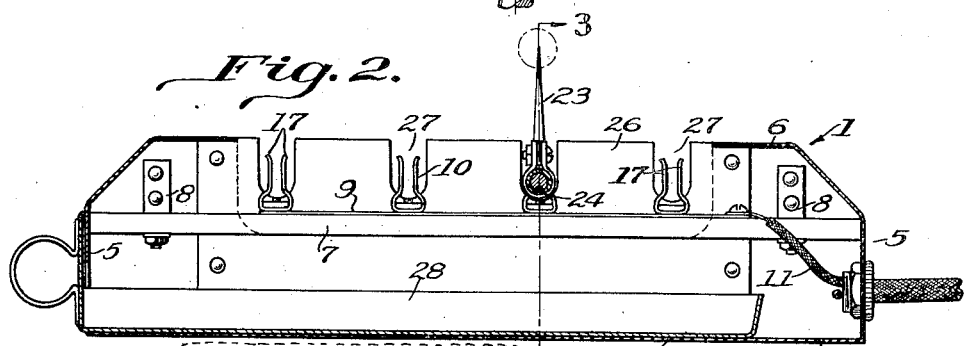
Figure 3:
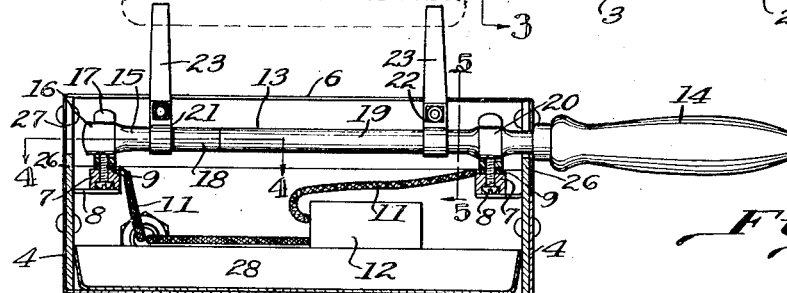
Figure 4:
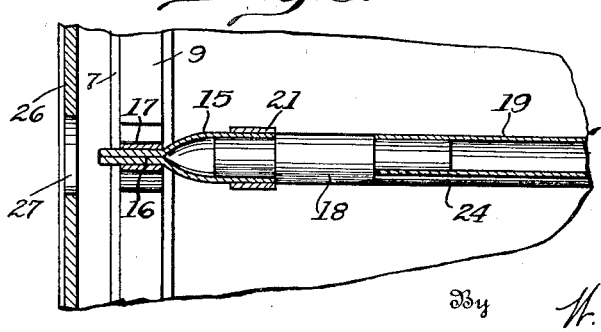
Figure 5:
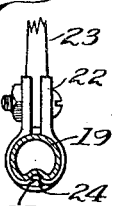

Other objects and advantages of the invention will be apparent during the course of the following detailed description taken in connection with the accompanying drawing forming a part of this specification, and in which drawing:

Figure 1 is a top plan view of the electric heating apparatus comprising the present invention, Figure 2 is a vertical longitudinal view taken on the line 2—2 of Figure 1, Figure 3 is a vertical transverse sectional view taken on the line 3—3 of Figure 2, Figure 4 is a detailed horizontal sectional view taken on the line 4—4 of Figure 3, Figure 5 is a detailed vertical sectional view taken on the line 5—5 of Figure 3.

Referring more particularly to the drawing, the numeral 1 designates the heating apparatus in its entirety which includes a base member 2 formed in any desired shape and of any suitable material but which in this instance, for illustrating purposes, comprises a sheet metal casing of substantially rectangular form when viewed in elevation. The casing or base 2 includes a bottom wall 3, sides and end walls 4 and 5 respectively, and a top wall 6, all of which are joined together in any well known manner such as by soldering, riveting or other forms of fastening.

Arranged longitudinally within the casing and positioned spaced from each of the side walls 4 thereof is a bar 7 formed of insulating material such as fiber, wood or the like and supported by brackets 8 carried by the side walls 4. Mounted upon the bars 7 and attached thereto in any suitable manner are metallic electric current conveying strips 9 carrying a plurality of spaced contact clips 10 which are open at their upper ends and each aligned with a similar clip of the opposite bar 7 in pairs. Connected to one of the ends of the strips 9 are wires 11 for carrying electric current which wires lead to any suitable outlet, and have connected therewith a switch 12 of any suitable type by which the current may be turned on or off, as desired.

Arranged to connect or bridge a pair of aligned contact clips 10 on the bars 7 is a food carrying or supporting member 13 which is equipped at one end with an operating handle 14 positioned exterior of the casing or base 2 and its other end formed with a metallic member 15 flattened as at 16 so as to frictionally enter between the resilient spaced ends 17 of the clip 10. The member 15 is insulated as at 18 from the metallic member 19 also formed with a flat portion 20 entering the gap provided between the resilient fingers of the clip carried by the opposite bar. The insulating member 18, which may be made of fiber or other insulating material, is rigidly attached to the members 15 and 19 thereby serving to hold said members in operative alignment with one another and the flat portions 16 and 20 of said members prevents axial rotation of the food support relative to their associated contact clips.

Carried by the metallic members 15 and 19 are clamps 21 and 22 to which are attached the lower ends of a pair of electrode prongs 23. The prongs 23 are sharpened at their upper ends or formed wedge-like so as to facilitate the positioning of the weiner, frankfurter or other similar article thereon, and which wedge-like points will easily penetrate the outer casing of such article and impale or imbed itself within the body thereof forming a good contact between the same and said electrode prongs.

In the operation of the device, it will be seen that after a weiner or other article has been positioned upon the prongs 23 and the current turned on by the switch 12, said current will pass through the weiner or other article and the material thereof will thus act as a resistance to the flow of the current and produce the desired heat of the food article. In this manner the food will be heated or cooked more quickly than is realized by the present methods of cooking. After the product has been heated thoroughly the support 13 with the product thereon may be removed from engagement with the contact clips 10 and lifted from the apparatus, breaking the circuit and permitting the removal of the product from the electrode prongs 23.

It has been found desirable to form the electrode prongs 23 of carbon instead of metal in that the metal contacting with the meat, forming the product, produces blackened areas therein at points engaging the electrodes which is overcome by the employment of the carbon. It is also of importance to arrange the width of the flattened or sharpened ends of the prongs longitudinally of the supporting member in that it forms a better contact surface between the electrodes and the food product for the passage of electric current therebetween and to prevent breaking the ends off the article as would be the case if the flattened points were arranged transversely thereof. The penetration of the casing of the food article at these spaced points will cause said casing to crack in a straight line between the prongs on the under side of the product when a certain heat has been reached, which will give an indication that such product has been cooked or heated sufficiently.

The carbon points, if broken, may be readily replaced by loosening the clamps by which they are attached to the members 15 and 19 and the electrode 23 attached to the clamp 22 may be adjustable longitudinally of the member 19 to accommodate the products of various lengths. The adjustable electrode is prevented from rotation relative to the member 19 by providing the latter with a longitudinal groove 24 on its under surface into which the indentation 25 formed with the lower portion of the clamp 22 is received, which acts as a key to hold the electrode in a vertical position but permits shifting thereof longitudinally of the member 19.

The contact clips 10, which are located in a plane below the top wall 6 of the housing so as to be wholly within the confines of the casing, are further protected by plates 26 formed of insulating material such as fiber or the like. The plates are attached to the side walls 4 and formed with notches 27 open at their upper ends and registering with the clips 10. The plates also serve as a protection for the hand of the operator and give the apparatus a more finished appearance.

From the foregoing it will be seen that an electric heating or cooking apparatus has been provided whereby food products such as weiners, frankfurters and the like may be heated or cooked by passing a flow of electric energy therethrough and which product will thus act as a resistance to the electric energy resulting in an intense internal temperature in the food product. The product after being thoroughly heated, may be readily removed from the apparatus by lifting the support 13 free from the contact clips 10 and thus automatically break the circuit for the electrodes carrying the product, permitting the latter to be conveniently disengaged from the electrode prongs.

Although only one support 13 has been illustrated, it will be understood that a number of these may be employed, one for each pair of opposed clips 10 and that the apparatus is not limited to any certain number of such clips and supports but that the same may be provided with any desired number to suit the requirements.

The casing may be provided with a pan 28 slidably positioned upon the bottom wall 3 of the casing and which is removable therefrom through one of the end walls 5 and serves to collect the drippings of grease, moisture and the like from the food product supported thereabove.

The device has the advantage of being extremely simple in its construction and operation and may be readily installed where electric current is available. Either direct or alternating current may be used in connection with the apparatus but best results are obtained when alternating current is used having a voltage of approximately 110. In cases where the voltage is higher than 110 a transformer may be built into the apparatus in order to step the voltage down to a desired point.

Although I have shown one particular form of apparatus it will be understood that various changes may be made therein such as in the construction of the base unit carrying the contact clips, the essential element being the food carrying support involving the spaced electrodes for the food product which support may be detached from the contact clips or from at least one of the clips for the convenient removal of the food product and I therefore do not desire to be limited to the specific structure shown and described but desire to make such changes as may fall fairly within the scope of the subjoined claims.

What is claimed is:

1. In a device of the class described including an elongated member having a pair of spaced metallic current carrying elements thereon, a manipulating handle at one end of said elongated member, an electrode prong attached to each of said metallic elements and adapted to have its upper end embedded within an article of food extending therebetween, and means formed with said metallic elements for detachably connecting the same in an electric circuit.

2. A device of the class described comprising a base, a pair of spaced resilient clips carried by said base, means for supplying electric current to said clips, a food supporting member including a pair of insulatively spaced metallic elements carrying a pair of electrodes for the attachment to an article of food to be heated by the current passing therethrough, and means formed with said metallic elements for detachably connecting said food carrying member from engagement with the clips of said base.

3. In a device of the character described, comprising a substantially rectangular casing open at its upper end, a pair of spaced current carrying bars arranged within said casing, a plurality of spaced resilient clips carried by said bars, the clips of one bar being aligned with the clips of the other bar, food supports bridging the space between said clips, each support being formed to include an elongated member having a pair of spaced metallic elements thereon adapted for contact with a pair of aligned clips, a vertically arranged carbon electrode connected with each of said elements and adapted to carry an article of food therebetween to be heated by the current passing therethrough, and a manipulating handle formed at one end of said elongated member whereby an operator may disconnect the food supports from contact with their respective clips, thereby breaking the circuit for said supports.

4. An electric food heater comprising a base, a pair of spaced current carrying bars supported on said base, a plurality of clips stationarily carried by said bars, the clips of one bar being aligned with the clips of the other bar, food carrying members detachably connected with aligned clips of said bars and each including a pair of spaced electrodes insulated from one another and arranged to carry an article of food therebetween to be heated by the current passing therethrough.

5. In an electric food heater, an elongated member having a pair of spaced metallic current carrying elements thereon, a manipulating handle at one end of said elongated member, a carbon electrode prong attached to each of said metallic elements and adapted to have its upper end embedded within an article of food extending therebetween, one of said prongs being adjustable longitudinally of the elongated member and means formed with said metallic element for detachably connecting the same in an electric circuit.

6. In an electric food heater, an elongated member having a pair of spaced metallic current carrying elements thereon, a manipulating handle at one end of said elongated member, an electrode prong attached to each of said metallic elements and formed to have its upper end embedded within and to support an article of food extending therebetween.

7. An electric food heater, comprising a base, a pair of spaced current carrying bars supported on said base, a food carrying member removably engageable with said bars and including a pair of spaced electrodes insulated from one another and adapted to carry an article of food therebetween to be heated by the current passing therethrough.

8. An electric food heater comprising an open frame, a pair of spaced current carrying terminals on said frame, a rigid food holder bridging the space between said terminals, said holder being formed to include an elongated member having a pair of spaced metallic elements thereon for contact with said terminals, a carbon electrode connected with each of said elements and arranged to carry an article of food therebetween to be heated by the current passing therethrough, and a manipulating handle formed at one end of said elongated member whereby the food support may be disconnected from contact with said terminals.

9. An electric food heater comprising an open frame, a pair of spaced current carrying terminals on said frame, a rigid holder removably engageable with said terminals and upon which an article of food is solely supported, impaling members insulated from one another and rigidly carried by said holder and formed to penetrate the article of food held thereby, said holders when in engagement with said terminals providing for the passage of current through the food article carried upon the impaling members.

10. As a new article of manufacture, a food holder for electric heaters, comprising a rigid elongated bar provided with a handle at one end and a pair of spaced carbon electrodes carried by said bar and insulated from each other.

11. As a new article of manufacture, a food holder for electric heaters comprising a rigid elongated bar formed with a handle at one end and a pair of electrodes carried by said bar and insulated from each other.

ALVA V. COURTRIGHT.